(12) United States Patent
Almarzooq

(10) Patent No.: US 11,714,208 B2
(45) Date of Patent: Aug. 1, 2023

(54) METHODS AND SYSTEMS FOR GRIDDING OF SALT STRUCTURES

(71) Applicant: Saudi Arabian Oil Company, Dhahran (SA)

(72) Inventor: Hassan Abbas Almarzooq, Safawa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 372 days.

(21) Appl. No.: 16/856,150

(22) Filed: Apr. 23, 2020

(65) Prior Publication Data
US 2021/0333424 A1    Oct. 28, 2021

(51) Int. Cl.
*G01V 1/30*    (2006.01)
*G01V 1/28*    (2006.01)
(Continued)

(52) U.S. Cl.
CPC .............. *G01V 1/301* (2013.01); *G01V 1/282* (2013.01); *G01V 1/366* (2013.01); *G01V 1/38* (2013.01);
(Continued)

(58) Field of Classification Search
CPC ........ G01V 1/301; G01V 1/282; G01V 1/366; G01V 1/38; G01V 1/32; G01V 2210/64; G01V 2210/6652; G01V 2210/616
See application file for complete search history.

(56) References Cited

U.S. PATENT DOCUMENTS 2,024,921 A * 12/1935 Green .................... G01V 1/003
367/40
5,012,675 A *  5/1991 Koller ...................... G01V 1/34
73/432.1
(Continued)

FOREIGN PATENT DOCUMENTS

CN         105116445 A     12/2015

OTHER PUBLICATIONS

F.W.H. Smit and et al, "Seismic geomorphology and origin of diagenetic geobodies in the Upper Cretaceous Chalk of the North Sea Basin", Basin Research, 30(5), 895-925, 2017 (Year: 2017).*
(Continued)

*Primary Examiner* — Douglas Kay
(74) *Attorney, Agent, or Firm* — Bracewell LLP; Constance G. Rhebergen; Keith R. Derrington

(57) ABSTRACT

Methods, systems, and computer readable media for gridding of subsurface salt structures include determining a predetermined area lacks three dimensional seismic coverage, generating a two dimensional seismic top salt interpretation for the predetermined area, generating a bathymetry elevation of the predetermined area, determining that at least one two dimensional seismic line intersects a bathymetric feature of interest, and determining a correlation coefficient between the two dimensional seismic top salt interpretation and the bathymetry elevation. The method may further include determining the correlation coefficient is greater than a predetermined threshold value, and applying the bathymetry elevation as an additional control for gridding top of the subsurface salt structure. The step of gridding the top of the subsurface salt structure may further include applying at least one of kriging with external drift (KED), polygon-based approaches, regression-kriging, and other geostatistical methods.

21 Claims, 7 Drawing Sheets

(51) Int. Cl.
*G01V 1/36* (2006.01)
*G01V 1/38* (2006.01)

(52) U.S. Cl.
CPC .. *G01V 2210/64* (2013.01); *G01V 2210/6652* (2013.01)

(56) References Cited

U.S. PATENT DOCUMENTS

| | | | |
|---|---|---|---|
| 6,112,155 | A | 8/2000 | Pham |
| 6,278,948 | B1* | 8/2001 | Jorgensen ................ G01V 1/30 702/14 |
| 6,424,918 | B1* | 7/2002 | Jorgensen ............. G01V 11/00 702/14 |
| 6,675,097 | B2 | 1/2004 | Routh et al. |
| 7,359,282 | B2 | 4/2008 | Tulett |
| 7,987,074 | B2 | 7/2011 | Carazzone et al. |
| 8,392,163 | B2 | 3/2013 | Liu |
| 8,938,373 | B2 | 1/2015 | Wienecke |
| 9,026,420 | B2* | 5/2015 | Gorell ...................... G01V 1/40 703/10 |
| 9,372,945 | B2 | 6/2016 | Ellis |
| 10,242,126 | B2 | 3/2019 | Zhdanov |
| 2009/0121720 | A1* | 5/2009 | Wahrmund ............ G01V 3/083 324/357 |
| 2010/0065266 | A1* | 3/2010 | Wahrmund ............ G01V 3/083 702/7 |
| 2014/0233352 | A1* | 8/2014 | Kacewicz ............ G01V 99/005 367/73 |
| 2016/0070829 | A1* | 3/2016 | Sun ...................... G01V 99/005 703/2 |
| 2020/0160173 | A1* | 5/2020 | Pandey ................ G01V 99/005 |

OTHER PUBLICATIONS

K. Yoshioka and et al, "Modeling large-scale geoelectrical structures with inhomogeneous backgrounds using the integral equation method: applications to the bathymetry effect study in marine CSEM data", SEG/New Orleans 2006 Annual Meeting (Year: 2006).*

Bureau of Ocean Energy Management; "BOEM Northern Gulf of Mexico Deepwater Bathymetry Grid from 3D Seismic" available as of Aug. 14, 2019 at: https://www.boem.gov/Gulf-of-Mexico-Deepwater-Bathymetry/; pp. 1-9.

Dirkx, R. et al.; "Integrating Multibeam Data in the Structural 2-D Seismic Interpretation Workflow: Examples from the Mexican Gulf of Mexico" Search and Discovery Article #42182, Feb. 5, 2018; pp. 1-27.

Gvirtzman, Zohar et al.;"Bathymetry of the Levant basin: interaction of salt-tectonics and surficial mass movements" Marine Geology 360, 2015; pp. 25-39.

Hengl, Tomislav et al.; "Comparison of kriging with external drift and regression-kriging" Jul. 3, 2003, International Institute for Geo-Information Science and Earth Observation (ITC) Enschede, The Netherlands; pgs.

Robla, Vaughn; "Structure of the Salt Surface and Comparison to Bathymetry From 2-D Multichannel Seismic Data: Texas and Louisiana Continental Slope, Northwestern Gulf of Mexico" abstract, University of Houston; p. 1.

International Search Report and Written Opinion for International Application No. PCT/US2021/028690, dated Jul. 16, 2021; pp. 1-13.

* cited by examiner

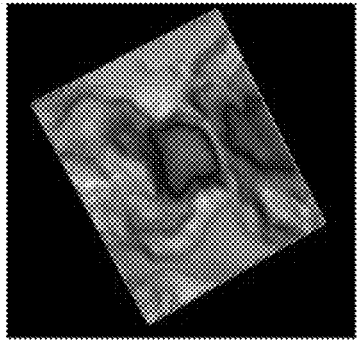
FIG. 5A
3D Seismic Grid
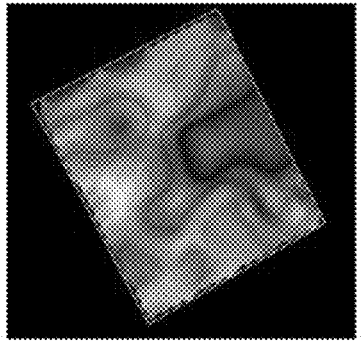
FIG. 5B
2D Seismic Grid
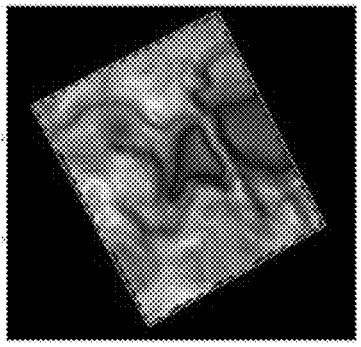
FIG. 5C
2D Seismic-Bathymetric Guided Grid (2D SBG)
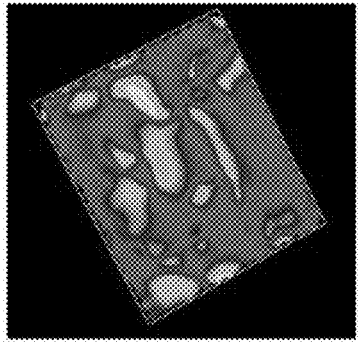
FIG. 5D
3D-2D Seismic Grid Difference
16% significant error
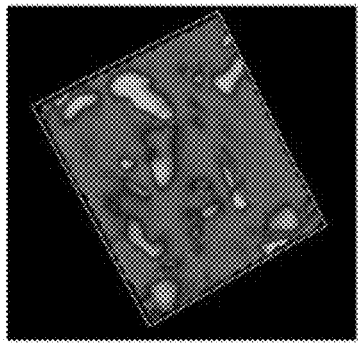
FIG. 5E
3D-2D SBG Difference
7% significant error
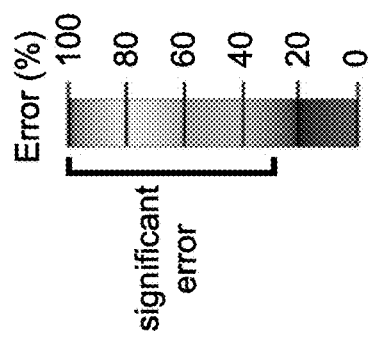

METHODS AND SYSTEMS FOR GRIDDING OF SALT STRUCTURES

TECHNICAL FIELD

Embodiments relate in general to gridding of salt structures, and more specifically to methods and systems for gridding of salt structures in areas that lack three dimensional seismic coverage.

BACKGROUND

Exploration for oil and gas in subsurface environments has traditionally been done with seismic imaging techniques that are now well known in the art. In some applications, and particularly where there exist zones of anomalous densities such as salt, seismic techniques alone fail to provide an adequate image as regions surrounding or beneath these zones are not clearly modelled. One particular example of a zone of anomalous density is a base of salt, such as that found in the Sudbury Basin in Ontario, Canada. Beneath the base of salt are significant deposits of minerals or of oil and gas, and in the case of the Sudbury basin, most notably, nickel deposits as has been shown, for example, in the Gulf of Mexico. Determining the shape of the base of salt is important in subsalt exploration. In the absence of an accurate model of these anomalous density zones, the model or image of mineral deposits or petroleum reservoirs below these zones cannot be determined with a high degree of confidence. Where seismic techniques alone fail to provide an adequate image of the base of salt, gravity response data can be used to complement the seismic data, by assisting in identifying the boundary of the base of salt, or other anomalous density zone.

As is known, the geologic component of the gravity field produced by such zones of anomalous densities, which is the component of interest, is a small fraction (approximately 2%) of the total measured gravity field. Therefore, a high level of precision and accuracy in measurement is required in order to resolve the geology with a fair degree of confidence. The advent of new and ever improving airborne gravity instrumentation, coupled with large data storage capacity and high processing speed makes it possible to develop better resolved interpretations of the airborne gravity information to thereby result in a more accurate boundary model of zones of anomalous density, such as a base of salt. It has also become standard practice in the art to model this gravity or magnetic data using inversion when complimenting the seismic, or other base data. The difficulty with relying extensively on inversion data is that the density model produced is not unique and can result in poor interpretations of the geologic boundary.

Furthermore, inversion techniques are often complex and require significant hardware processing time and resources. This is particularly important when attempting to precisely define boundaries of anomalous density zones with greater and greater precision and accuracy.

There is therefore a need in the art for a method and system that allows for more accurate and precise modelling of subsurface environments, and particularly those that include one or more regions of anomalous density zones such as regions of salt and have a base of salt below which there may be significant petroleum resources or mineral deposits. There is a further need in the art for a method and system that provides for accurate and precise modelling of subsurface environments that is less demanding on processing time and hardware resources than prior art methods and systems. There is a further need in the art to solve one or more of the above-identified problems with the prior art and for an improved method and system for earth modelling, and particularly for earth modelling of regions having one or more anomalous density zones.

SUMMARY

Accordingly one embodiment is a system for improving the depth estimates for the top of salt in areas that lack three dimensional seismic coverage. Another embodiment provides better definition of the salt geometries in areas that lack three dimensional seismic coverage.

One embodiment is a method for gridding of subsurface salt structures. The method includes determining a predetermined area lacks three dimensional seismic coverage, generating a two dimensional seismic top salt interpretation for the predetermined area, generating a bathymetry elevation of the predetermined area, determining that at least one two dimensional seismic line intersects a bathymetric feature of interest, and determining a correlation coefficient between the two dimensional seismic top salt interpretation and the bathymetry elevation. The method may further include determining the correlation coefficient is greater than a predetermined threshold value, and applying the bathymetry elevation as an additional control for gridding top of the subsurface salt structure. The step of gridding the top of the subsurface salt structure may further include applying at least one of kriging with external drift (KED), polygon-based approaches, regression-kriging, and other geostatistical methods. The step of applying the geostatistical method may further include smoothing the two dimensional seismic top salt interpretation for the predetermined area, and smoothing the bathymetry elevation of the predetermined area. The step of applying the geostatistical method may also include deriving an experimental variogram from the two dimensional seismic top salt interpretation and the smoothed bathymetry elevation of the predetermined area, and fitting a variogram model to the experimental variogram derived from the two dimensional seismic top salt interpretation and the smoothed bathymetry elevation of the predetermined area. The step of applying the geostatistical method may also include applying a variogram model to grid the two dimensional seismic top salt interpretation. The method may further include applying the bathymetry elevation as an additional control, and generating a top salt grid using the variogram model.

Another example embodiment is a system for gridding of subsurface salt structures. The system includes a computer comprising non-transitory computer readable medium including program instructions that when executed by a processor cause the processor to perform the operations of determining a predetermined area lacks three dimensional seismic coverage, generating a two dimensional seismic top salt interpretation for the predetermined area, generating a bathymetry elevation of the predetermined area, determining that at least one two dimensional seismic line intersects a bathymetric feature of interest, and determining a correlation coefficient between the two dimensional seismic top salt interpretation and the bathymetry elevation. The method may further include determining the correlation coefficient is greater than a predetermined threshold value, and applying the bathymetry elevation as an additional control for gridding top of the subsurface salt structure. The step of gridding the top of the subsurface salt structure may further include applying at least one of kriging with external drift (KED), polygon-based approaches, regression-kriging, and other geostatistical methods. The step of applying the geostatistical method may further include smoothing the two dimensional seismic top salt interpretation for the predetermined area, and smoothing the bathymetry elevation of the predetermined area. The step of applying the geostatistical method may also include deriving an experimental variogram from the two dimensional seismic top salt interpretation and the smoothed bathymetry elevation of the predetermined area, and fitting a variogram model to the experimental variogram derived from the two dimensional seismic top salt interpretation and the smoothed bathymetry elevation of the predetermined area. The step of applying the geostatistical method may also include applying a variogram model to grid the two dimensional seismic top salt interpretation. The method may further include applying the bathymetry elevation as an additional control, and generating a top salt grid using the variogram model.

Another example embodiment is a computer-readable program including program instructions that when executed by a processor cause the processor to perform the operations of determining a predetermined area lacks three dimensional seismic coverage, generating a two dimensional seismic top salt interpretation for the predetermined area, generating a bathymetry elevation of the predetermined area, determining that at least one two dimensional seismic line intersects a bathymetric feature of interest, and determining a correlation coefficient between the two dimensional seismic top salt interpretation and the bathymetry elevation. The method may further include determining the correlation coefficient is greater than a predetermined threshold value, and applying the bathymetry elevation as an additional control for gridding top of the subsurface salt structure. The step of gridding the top of the subsurface salt structure may further include applying at least one of kriging with external drift (KED), polygon-based approaches, regression-kriging, and other geostatistical methods. The step of applying the geostatistical method may also include deriving an experimental variogram from the two dimensional seismic top salt interpretation and the smoothed bathymetry elevation of the predetermined area, and fitting a variogram model to the experimental variogram derived from the two dimensional seismic top salt interpretation and the smoothed bathymetry elevation of the predetermined area. The step of applying the geostatistical method may also include applying a variogram model to grid the two dimensional seismic top salt interpretation. The method may further include applying the bathymetry elevation as an additional control, and generating a top salt grid using the variogram model.

BRIEF DESCRIPTION OF THE DRAWINGS

All aspects and features of certain example embodiments of the present disclosure will be more apparent from the following description taken in conjunction with the accompanying drawings, in which:

FIGS. 5A-E illustrate example top salt depth grids where FIG. 5A is based on three dimensional seismic interpretation, FIG. 5B is based on two dimensional seismic interpretation, FIG. 5C is based on two dimensional seismic interpretation and bathymetry guided grid, FIG. 5D is the depth error of grid shown in FIG. 5B using the three dimensional seismic grid as the control, and FIG. 5E is the depth error of grid shown in FIG. 5C using the three dimensional seismic grid as the control, according to one embodiment of the disclosure.

DETAILED DESCRIPTION

Figure 1:
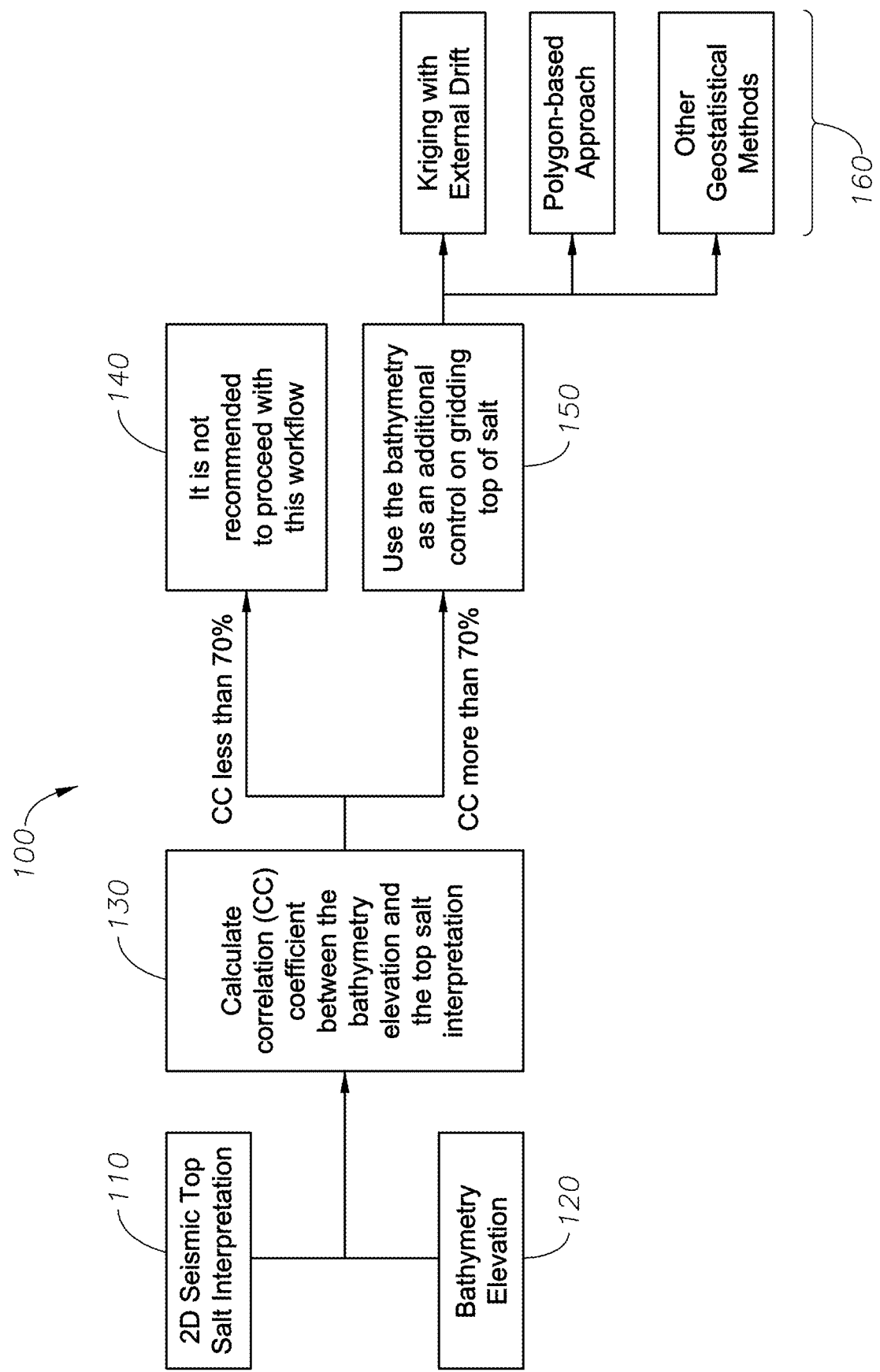
FIG. 1 illustrates example steps in a method for gridding top of salt using two dimensional seismic top salt interpretation and bathymetry elevation, according to one embodiment of the disclosure.

The particulars shown here are by way of example and for purposes of illustrative discussion of the examples of the subject disclosure only, and are presented in the cause of providing what is believed to be the most useful and readily understood description of the principles and conceptual aspects of the subject disclosure. In this regard, no attempt is made to show more detail than is necessary, the description taken with the drawings making apparent to those skilled in the art how the several forms of the subject disclosure may be embodied in practice. Furthermore, like reference numbers and designations in the various drawings indicate like elements.

The term "bathymetry" as used herein is the study of underwater depth of lake or ocean floors. In other words, bathymetry is the underwater equivalent to hypsometry or topography. Bathymetric charts are typically produced to support safety of surface or sub-surface navigation, and usually show seafloor relief or terrain as contour lines (called depth contours or isobaths) and selected depths (soundings), and typically also provide surface navigational information. Bathymetric maps (a more general term where navigational safety is not a concern) may also use a Digital Terrain Model and artificial illumination techniques to illustrate the depths being portrayed.

The term "seismic exploration" is the search for commercially economic subsurface deposits of crude oil, natural gas and minerals by the recording, processing, and interpretation of artificially induced shock waves in the earth. Artificial seismic energy is generated on land by vibratory mechanisms mounted on specialized trucks. Seismic waves reflect and refract off subsurface rock formations and travel back to acoustic receivers called geophones. The travel times (measured in milliseconds) of the returned seismic energy, integrated with existing borehole well information, aid geoscientists in estimating the structure (folding and faulting) and stratigraphy (rock type, depositional environment, and fluid content) of subsurface formations, and determine the location of prospective drilling targets.

In two-dimensional (2D) reflection seismic surveying both the sound source and the sound detectors (numbering up to a hundred or more per shot) are moved along a straight line. The same line contains recording cables and geophones as well as source points. The resultant product can be thought of as a vertical sonic cross-section of the subsurface beneath the survey line. It is constructed by summing many compressional (pressure) wave reflections from the various sound source and sound detector locations at the halfway sound path points beneath each location (common depth point stacking).

In three-dimensional (3D) reflection seismic surveying the sound detectors (numbering up to a thousand or more) are spread out over an area and the sound source is moved from location to location through the area. 3D seismic programs are generally a uniform and evenly spaced grid of lines. Receiver lines containing the recording devices (geophones) usually, but not always, run in a direction perpendicular or diagonal to the source lines. The resultant product can be thought of as a cube of common depth point stacked reflections. Advantages over 2D include the additional dimension, the fact that many more reflections are available for stacking at each point, which provides greatly improved resolution of subsurface features, and elimination of the "ghost" or "side swipe" reflections from nearby offline features that 2D surveys are prone to.

FIG. 1 illustrates example steps in a method 100 for gridding top of salt using two dimensional seismic top salt interpretation and bathymetry elevation, according to one embodiment of the disclosure. As a first step, the method includes determining that a predetermined area lacks three dimensional seismic coverage. Next, the method includes generating a two dimensional seismic top salt interpretation for the predetermined area in step 110. Next, the method includes generating a bathymetry elevation of the predetermined area at step 120, and determining that at least one two dimensional seismic line intersects a bathymetric feature of interest. The method 100 further includes determining a correlation coefficient between the two dimensional seismic top salt interpretation and the bathymetry elevation at step 130. If, in step 140, the correlation coefficient is lesser than a predetermined threshold value, then it is not recommended to proceed with this workflow, and as a result the method is ended. However, if at step 150 it is determined that the correlation coefficient is greater than the predetermined threshold value, then the method 100 includes applying the bathymetry elevation as an additional control for gridding top of the subsurface salt structure. The step 160 of gridding the top of the subsurface salt structure may further include applying at least one of kriging with external drift (KED), polygon-based approaches, regression-kriging, and other geostatistical methods.

In applied statistics, regression-kriging (RK) is a spatial prediction technique that combines a regression of the dependent variable on auxiliary variables (such as parameters derived from digital elevation modelling, remote sensing/imagery, and thematic maps) with kriging of the regression residuals. It is mathematically equivalent to the interpolation method variously called universal kriging and kriging with external drift, where auxiliary predictors are used directly to solve the kriging weights.

Here, the step of applying the geostatistical method may further include smoothing the two dimensional seismic top salt interpretation for the predetermined area, and smoothing the bathymetry elevation of the predetermined area. The step of applying the geostatistical method may also include deriving an experimental variogram from the two dimensional seismic top salt interpretation and the smoothed bathymetry elevation of the predetermined area, and fitting a variogram model to the experimental variogram derived from the two dimensional seismic top salt interpretation and the smoothed bathymetry elevation of the predetermined area. The step of applying the geostatistical method may also include applying a variogram model to grid the two dimensional seismic top salt interpretation. The method may further include applying the bathymetry elevation as an additional control, and generating a top salt grid using the variogram model.

A variogram is a description of the spatial continuity of the data. The experimental variogram is a discrete function calculated using a measure of variability between pairs of points at various distances. In spatial statistics the theoretical variogram is a function describing the degree of spatial dependence of a spatial random field or stochastic process. A variogram model is chosen from a set of mathematical functions that describe spatial relationships. The appropriate model is chosen by matching the shape of the curve of the experimental variogram to the shape of the curve of the mathematical function.

Figure 2:
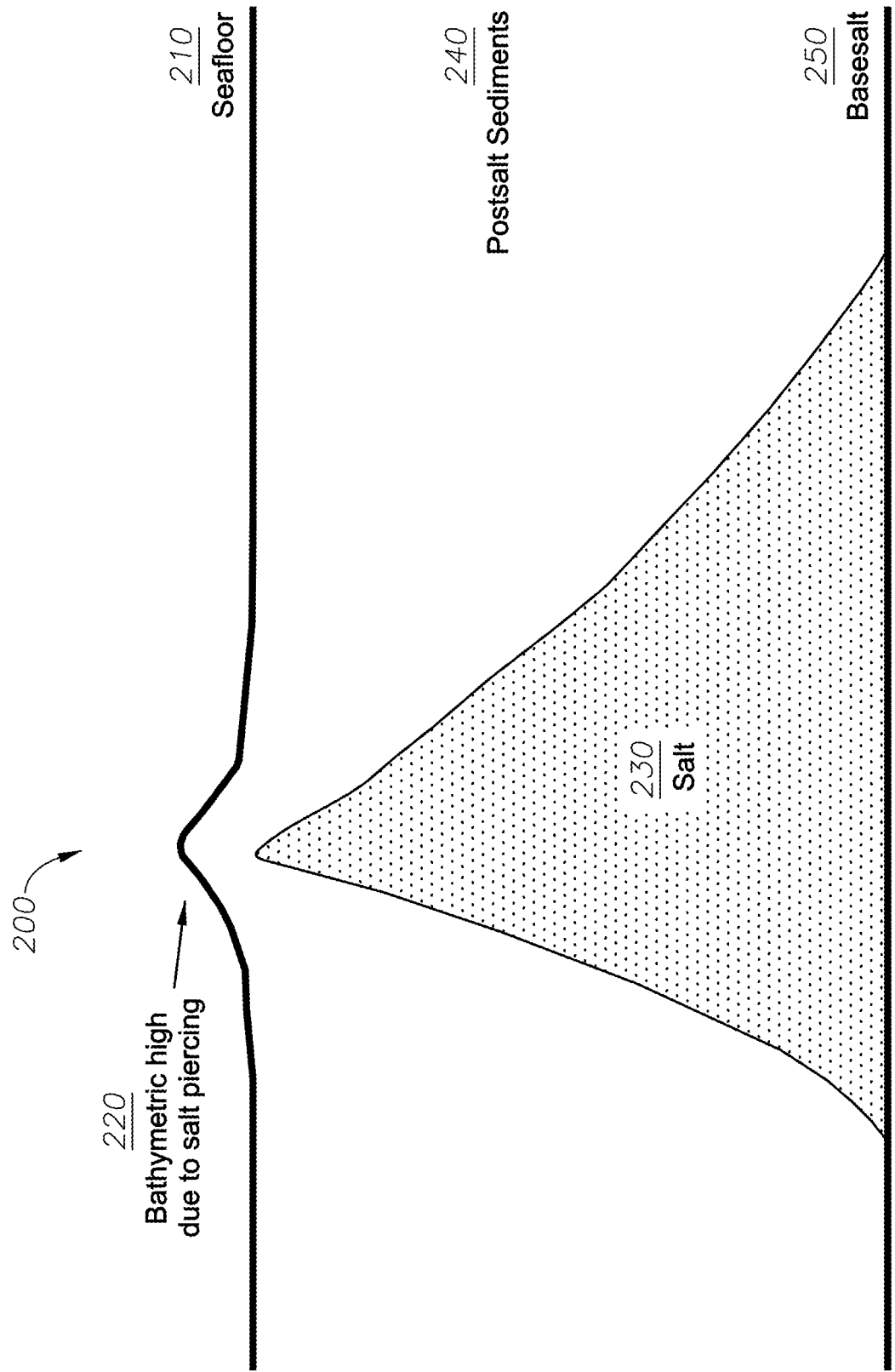
FIG. 2 illustrates a cross-sectional view at the seafloor showing salt piercing creating bathymetric highs, according to one embodiment of the disclosure.
Figure 3:
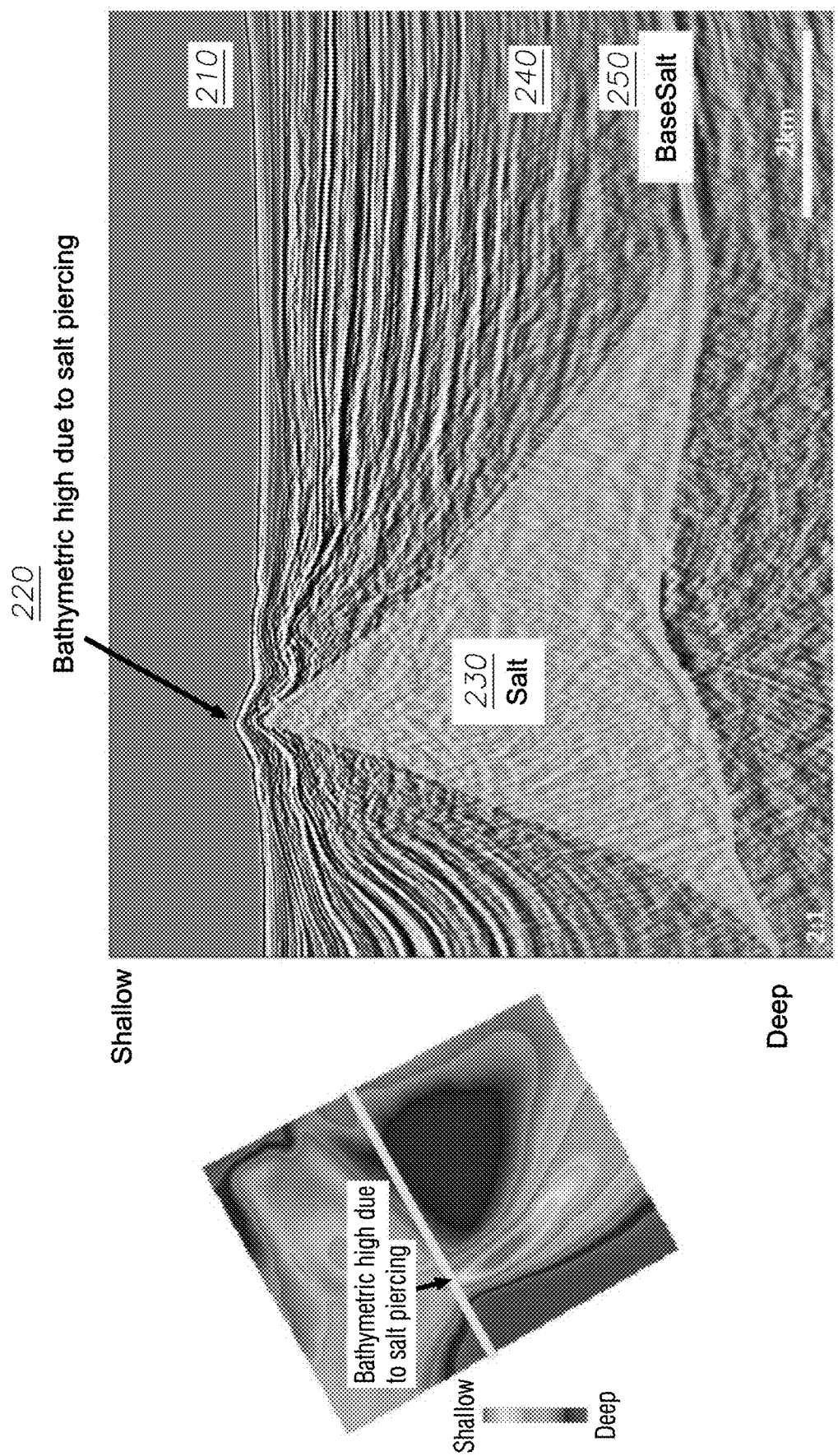
FIG. 3 illustrates a seismic cross-sectional view at the seafloor showing salt piercing creating bathymetric highs, according to one embodiment of the disclosure.

FIG. 2 illustrates a two-dimensional cross-sectional view 200 of the seafloor 210 showing salt piercing 220 creating bathymetric highs, according to one embodiment of the disclosure. As illustrated in this figure, the cross-section includes the subsurface salt structure 230 in the area of interest, the post-salt sediments 240, and the base salt 250. FIG. 3 illustrates a seismic cross-sectional view of the seafloor 210 shown in FIG. 2, showing salt piercing 220 creating bathymetric highs, according to one embodiment of the disclosure. As illustrated in the figure on the left side of FIG. 3, the shallow portions of the seismic cross-sectional view are indicated using a lighter shading, and the deeper portions of the seafloor are indicated using a darker shading.

Figure 4:
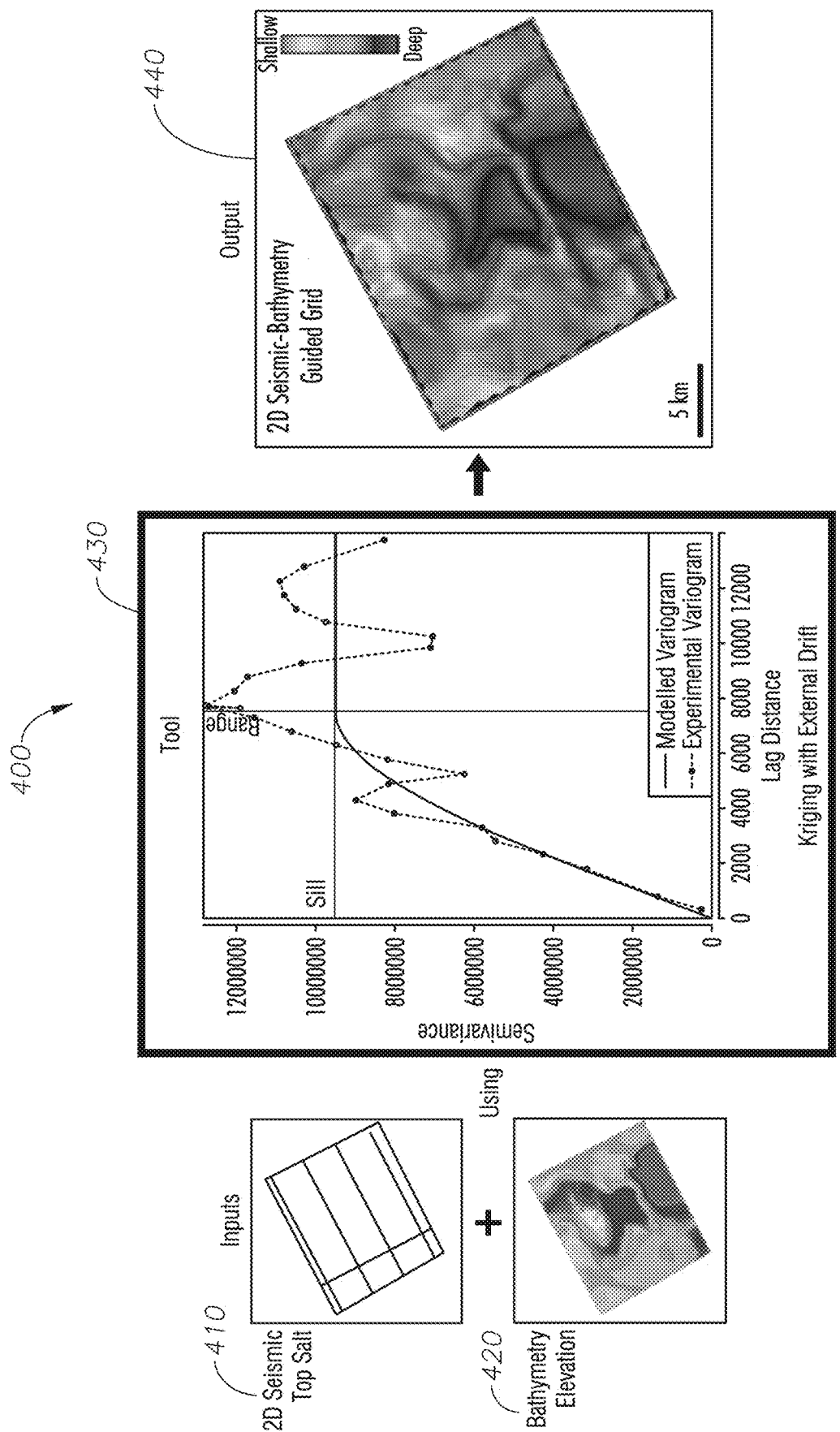
FIG. 4 illustrates example steps in a method for gridding top of salt using two dimensional seismic top salt interpretation and bathymetry elevation, according to one embodiment of the disclosure.

FIG. 4 illustrates example steps in a method 400 for gridding top of salt using two dimensional seismic top salt interpretation and bathymetry elevation, according to one embodiment of the disclosure. Two datasets are required to proceed with this workflow including two dimensional seismic data 410 and bathymetry elevation 420. At least one seismic line should intersect the bathymetric feature of interest, which is used to confirm that this feature is related to salt structures. Additionally, the top salt horizon should be interpreted on all of the available seismic two dimensional lines. At step 430, a correlation factor is calculated by cross-plotting the top salt interpretation and the bathymetry elevation. A correlation factor greater than 70% is recommended when applying this method to have stable and reliable results.

At step 440, using the bathymetry as an additional control is recommended once the correlation has been established. Several methods can be used to perform this integration such as kriging with external drift (KED), polygon-based approaches, regression-kriging, or other geostatistical methods. For example, in step 430, the KED process starts with conditioning the input data such as having a sufficiently smooth drift (trend) surface. The input datasets consist of the control points, which are the top salt interpretation from two dimensional seismic, and the drift surface, which is a smoothed bathymetry grid. Then, a variogram model, preferably a spherical variogram model, is fitted to an experimental variogram derived from the data. Finally, this variogram model is used to generate a top salt grid that uses the bathymetry elevation as an additional control, and as illustrated in step 440.

FIGS. 5A-E illustrate example top salt depth grids where FIG. 5A is based on three dimensional seismic interpretation, FIG. 5B is based on two dimensional seismic interpretation, FIG. 5C is based on two dimensional seismic interpretation and bathymetry guided grid, FIG. 5D is the depth error of grid shown in FIG. 5B using the three dimensional seismic grid as the control, and FIG. 5E is the depth error of grid shown in FIG. 5C using the three dimensional seismic grid as the control, according to one embodiment of the disclosure.

The above described method was performed in an area with three dimensional seismic coverage, which was used to validate the results of the study. As illustrated in FIGS. 5D and 5E, it was found that this method reduced the error in the depth estimated for the top salt by 50% when compared to conventional two dimensional gridding methods, in that the 3D-2D seismic grid produced a 16% error, and the inventive 3D-2D seismic bathymetry guided grid produced only a 7% error.

Figure 6:
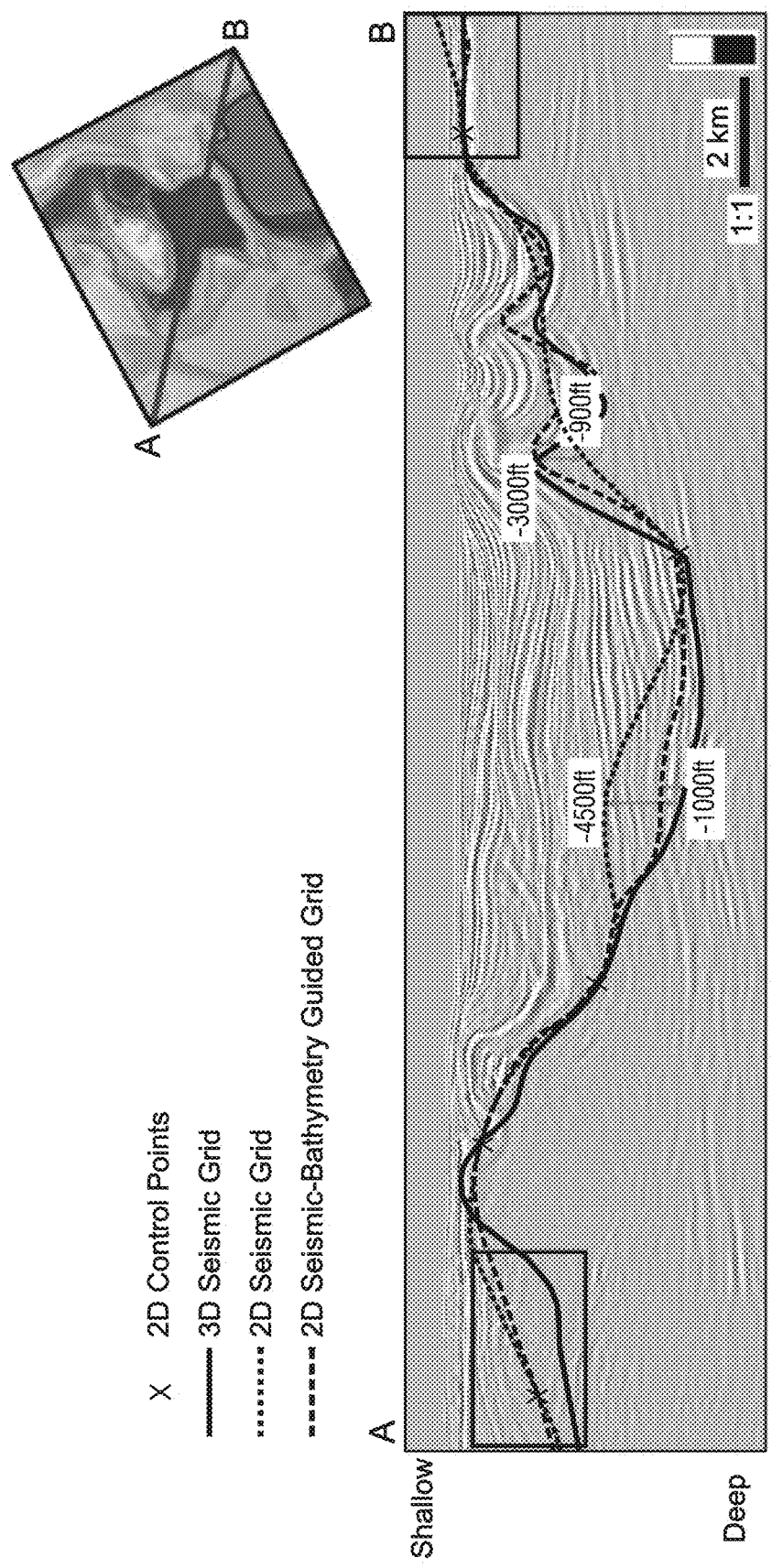
FIG. 6 illustrates a seismic cross-sectional showing the difference between the three grids, according to one embodiment of the disclosure.

FIG. 6 illustrates a seismic cross-sectional view showing the difference between the three grids, according to one embodiment of the disclosure. As illustrated in FIG. 6, it was found that this method reduced the error in the depth estimated for the top salt by 50% when compared to conventional two dimensional gridding methods, in that the 3D-2D seismic grid produced a 16% error, and the inventive 3D-2D seismic bathymetry guided grid produced only a 7% error.

Figure 7:
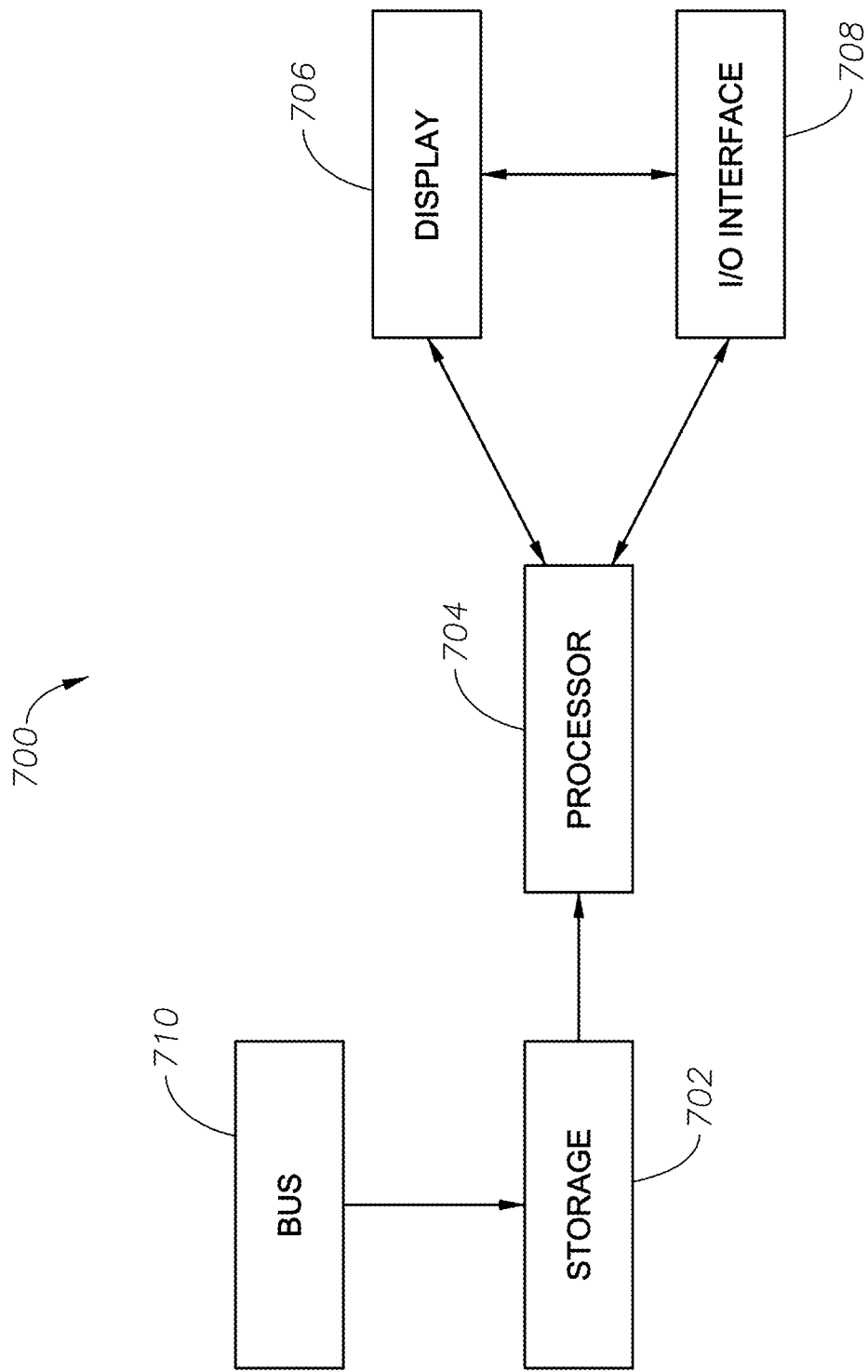
FIG. 7 is a schematic drawing of a representative computer system that may be used for carrying out the methods of FIGS. 1-6, according to one embodiment of the disclosure.

FIG. 7 is a schematic drawing of a representative computer system 700 that may be used for carrying out the methods of FIGS. 1-6, according to one embodiment of the disclosure. The system 700 includes a data storage device or memory 702. The stored data may be made available to a processor 704, such as a programmable general purpose computer. The processor 704 may include interface components such as a display 706 and an input and/or output (I/O) interface 708. The interface 708 may be used both to display data and processed data products and to allow the user to select among options for implementing aspects of the method. Data may be transferred to the system 700 via a bus 710 either directly from a data acquisition device, or from an intermediate storage or processing facility (not shown).

As will be appreciated, the individual data sources, modeling modules and view modules may be typical software programs in accordance with usual practice. The central data management module is designed in accordance with the input and output requirements of these modules. In an embodiment, the various modules are implemented in an object oriented programming language in which properties are defined in accordance with specified classes. When one of the modules initiates a change to a particular item of data, either in response to a user input or as a result of a modeling calculation, the change is returned to the central data management module which then propagates the change to the data in the same class as the changed data, thereby ensuring that all modules are synchronized.

As described in the above embodiments, Regression-kriging can be automated e.g. in R statistical computing environment, by using gstat and/or geoR package. Typical inputs include interpolation set (point map) at primary locations, minimum and maximum expected values and measurement precision, continuous predictors (raster map) at new unvisited locations, discrete predictors (polygon map), validation set (point map), lag spacing and limiting distance (required to fit the variogram). Typical outputs include map of predictions and relative prediction error, best subset of predictors and correlation significance (adjusted R-square), variogram model parameters, GLS drift model coefficients, and accuracy of prediction at validation points: mean prediction error (MPE) and root mean square prediction error (RMSPE).

Regression-kriging-based algorithms play more and more important role in geostatistics because the number of possible covariates is increasing every day. For example, digital elevation models (DEMs) are now available from a number of sources. Detailed and accurate images of topography can now be ordered from remote sensing systems such as SPOT and ASTER; SPOTS offers the High Resolution Stereoscopic (HRS) scanner, which can be used to produce DEMs at resolutions of up to 5 m. Finer differences in elevation can also be obtained with airborne laser-scanners.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur.

While there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

Although only a few examples have been described in detail above, those skilled in the art will readily appreciate that many modifications are possible in the examples without materially departing from this subject disclosure.

Accordingly, all such modifications are intended to be included within the scope of this disclosure as defined in the following claims. In the claims, means-plus-function clauses are intended to cover the structures described as performing the recited function and not only structural equivalents, but also equivalent structures.

The invention claimed is:

1. A method for gridding of subsurface salt structures, the method comprising:
    determining a predetermined area that lacks three-dimensional seismic coverage;
    generating a two-dimensional map of seismic top salt interpretation for the predetermined area based on data received from a two-dimensional reflection seismic survey performed by moving both sound sources and sound detectors along a straight line;
    generating a map of bathymetry elevation of the predetermined area;
determining that at least one two dimensional seismic line intersects a bathymetric feature of interest;
    and determining a correlation coefficient between the two dimensional seismic top salt interpretation and the bathymetry elevation by cross-plotting the two dimensional seismic top salt interpretation and the bathymetry elevation.

2. The method of claim 1, further comprising:
    determining the correlation coefficient is greater than a predetermined threshold value of 70%,
    applying the bathymetry elevation as an additional control for gridding top of the subsurface salt structure; and
    wherein, the sound detectors comprise geophones and the sound sources comprise source points, and wherein recording cables, the geophones, and the source points are on the same line.

3. The method of claim 2, wherein gridding the top of the subsurface salt structure further comprises:
    applying at least one of kriging with external drift (KED), polygon-based approaches, regression-kriging, and other geostatistical methods.

4. The method of claim 3, wherein applying the geostatistical method further comprises:
    generating the two dimensional seismic top salt interpretation for the predetermined area; and
    smoothing the bathymetry elevation of the predetermined area.

5. The method of claim 4, wherein applying the geostatistical method further comprises:
    deriving an experimental variogram from the two dimensional seismic top salt interpretation and the smoothed bathymetry elevation of the predetermined area; and
    applying a variogram model to grid the two dimensional seismic top salt interpretation.

6. The method of claim 5, wherein the variogram model comprises a spherical variogram model.

7. The method of claim 5, further comprising:
    applying the bathymetry elevation as an additional control; and
    generating a top salt grid using the variogram model.

8. The method of claim 7, thereby improving a depth estimate for the top of the salt structure, and improving a definition of the salt structure geometry.

9. A system for gridding of subsurface salt structures, the system comprising:
    a line that is moved a straight line for performing a two-dimensional reflection seismic survey and that comprises sound detectors, sound sources, and recording cables,
    a computer that is communication with the sound detectors and that comprise non-transitory computer readable medium including program instructions that when executed by a processor cause the processor to perform the operations of:
    determining a predetermined area that lacks three-dimensional seismic coverage;
    generating a two-dimensional map of seismic top salt interpretation for the predetermined area based on data received from the two-dimensional reflection seismic survey performed by moving both sound sources and sound detectors along the straight line;
    generating a map of bathymetry elevation of the predetermined area;
    determining that at least one two dimensional seismic line intersects a bathymetric feature of interest;
    deriving an experimental variogram from the two dimensional seismic top salt interpretation and the smoothed bathymetry elevation of the predetermined area;
    fitting a variogram model to the experimental variogram to grid the two dimensional seismic top salt interpretation;
    determining a correlation coefficient between the two dimensional seismic top salt interpretation and the bathymetry elevation by cross-plotting the two dimensional seismic top salt interpretation and the bathymetry elevation;
    and applying the bathymetry elevation as an additional control for gridding top of the subsurface salt structure when the correlation coefficient is greater than 70%.

10. The system of claim 9, wherein gridding the top of the subsurface salt structure further comprises:
    applying at least one of kriging with external drift (KED), polygon-based approaches, regression-kriging, and other geostatistical methods.

11. The system of claim 10, wherein applying the geostatistical method further comprises:
    generating the two dimensional seismic top salt interpretation for the predetermined area; and
    smoothing the bathymetry elevation of the predetermined area.

12. The system of claim 11, wherein applying the geostatistical method further comprises:
    applying a variogram model to grid the two dimensional seismic top salt interpretation.

13. The system of claim 12, wherein the variogram model comprises a spherical variogram model.

14. The system of claim 13, further comprising the operations of:
    applying the bathymetry elevation as an additional control; and
    generating a top salt grid using the variogram model.

15. A computer-readable program including program instructions that when executed by a processor cause the processor to perform the operations of:
    determining a predetermined area that lacks three-dimensional seismic coverage;
    generating a two-dimensional map of seismic top salt interpretation for the predetermined area based on data received from a two-dimensional reflection seismic survey performed by moving sound sources and sound detectors along a straight line;
    generating a map of bathymetry elevation of the predetermined area;
    determining that at least one two-dimensional seismic line intersects a bathymetric feature of interest;
    determining a correlation coefficient between the two-dimensional seismic top salt interpretation and the bathymetry elevation by cross-plotting the two-dimensional seismic top salt interpretation and the bathymetry elevation.

16. The program of claim 15, wherein the operations further comprise:
    determining the correlation coefficient is greater than a predetermined threshold value; and
    applying the bathymetry elevation as an additional control for gridding top of the subsurface salt structure when the correlation coefficient exceeds 70%.

17. The program of claim 16, wherein gridding the top of the subsurface salt structure further comprises:
    applying at least one of kriging with external drift (KED), polygon-based approaches, regression-kriging, and other geostatistical methods.

18. The program of claim 17, wherein applying the geostatistical method further comprises:
    generating the two dimensional seismic top salt interpretation for the predetermined area; and
    smoothing the bathymetry elevation of the predetermined area.

19. The program of claim 18, wherein applying the geostatistical method further comprises:
    deriving an experimental variogram from the two dimensional seismic top salt interpretation and the smoothed bathymetry elevation of the predetermined area; and
    applying a variogram model to grid the two dimensional seismic top salt interpretation.

20. The program of claim 19, wherein the variogram model comprises a spherical variogram model.

21. The program of claim 19, further comprising the operations of:
    applying the bathymetry elevation as an additional control; and
    generating a top salt grid using the variogram model.

* * * * *

UNITED STATES PATENT AND TRADEMARK OFFICE
CERTIFICATE OF CORRECTION

PATENT NO. : 11,714,208 B2
APPLICATION NO. : 16/856150
DATED : August 1, 2023
INVENTOR(S) : Almarzooq Page 1 of 1

It is certified that error appears in the above-identified patent and that said Letters Patent is hereby corrected as shown below:

In the Claims

Column 9, Claim 9, Line 3:
"moved a straight line"
Should be changed to:
--moved along a straight line--; and Column 10, Claim 9, Line 1:
"a computer that is communication"
Should be changed to:
--a computer that is in communication--.

Signed and Sealed this
Fifth Day of September, 2023

Katherine Kelly Vidal
*Director of the United States Patent and Trademark Office*